July 26, 1927.
P. MUELLER ET AL
1,637,231
SWIVEL CONNECTION
Original Filed Nov. 12, 1919
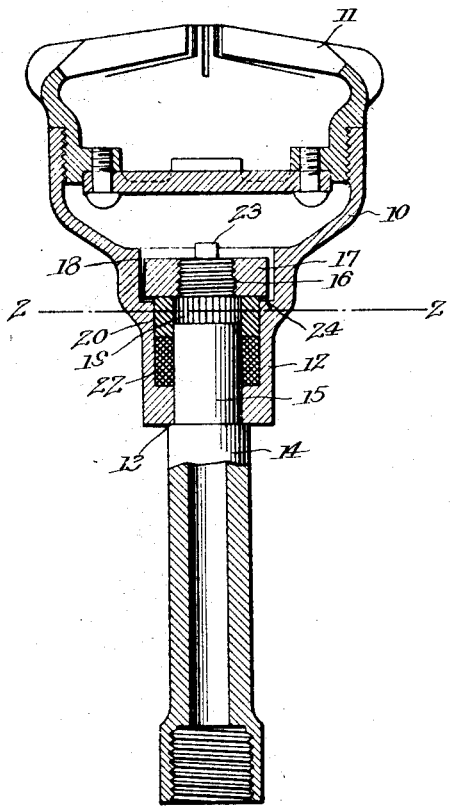
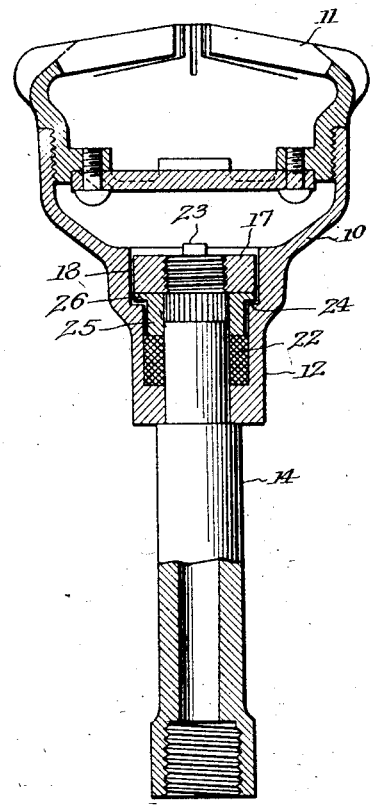
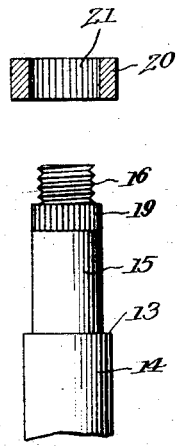
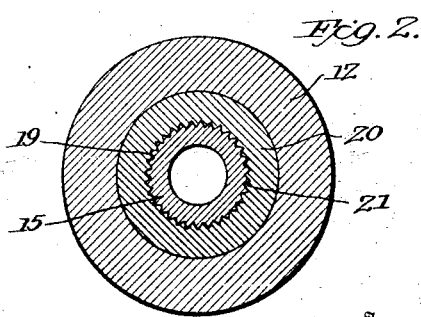
Inventor
Philip Mueller
Anton C. Schvermann Patented July 26, 1927.

1,637,231

UNITED STATES PATENT OFFICE.

PHILIP MUELLER AND ANTON C. SCHUERMANN, OF DECATUR, ILLINOIS, ASSIGNORS TO ADOLPH MUELLER, TRUSTEE, OF DECATUR, ILLINOIS.

SWIVEL CONNECTION.

Original application filed November 12, 1919, Serial No. 337,492. Divided and this application filed June 12, 1924. Serial No. 719,555.

This invention relates to drinking fountains, and particularly to means for rotatably connecting the bubbler head to a supply pipe, so that continued rotary movement of the head relative to the pipe will not cause loosening of the locking member.

This case is a division, under official requirement, of copending application Ser. No. 337,492, filed November 12, 1919, which has matured into Patent No. 1,512,627, dated October 21, 1924.

A primary object of the invention is to provide a connection between the supply pipe and the bubbler head, in which a washer is positively interlocked to the supply pipe, so that the bubbler head may rotate independently of the washer and without danger of unscrewing the retaining nut from the pipe.

In the drawings:

Figure 1 is a vertical sectional view of a drinking fountain made in accordance with the invention.

Figure 2 is a sectional view taken substantially along the line 2—2 of Figure 1.

Figure 3 is a sectional detail view of the parts disassembled.

Figure 4 is a vertical sectional view showing a modified form of the invention.

Referring to the drawings, in which like numerals indicate like parts in the several views, the bubbler head comprises a cup portion 10 having its upper end internally threaded for the reception of the hollow cap 11, and its lower end provided with the reduced neck 12, arranged to rest upon the shoulder 13 formed on the nipple 14. The nipple 14 is internally threaded at its lower end so that it may be screwed into place on the end of the supply pipe (not shown), and the upper end or stem 15 of the nipple for a substantial distance of its length is of reduced diameter, so as to permit the bubbler head to be rotatably mounted on the pipe.

The upper end of the reduced portion 15 is externally threaded, as at 16, so as to receive the internal threads of a locking nut 17, which locking nut lies within the large counter-bore 18 of the bubbler head, when the parts are properly assembled.

Immediately below the threaded portion 16 is a ring of vertical corrugations or serrations 19, which are preferably of less length than the thickness of the washer or packing ring 20. The washer 20 is provided with a central opening having longitudinal corrugations or serrations 21 which are equal in number and like in size to the corrugations 19 on the stem 15, so as to interlock therewith. A packing 22 of any suitable material surrounds the stem 15 and is inserted between the lower portion of the neck 12 and the washer 20.

Upon the upper surfaces of the retaining nut 17 are lugs 23, which are engaged by a suitable tool, such as a spanner wrench, when it is desired to unscrew the nut from its place from the nipple 15. It is, of course, understood that the lugs 23 may be replaced by a kerf or other means to permit ready removal of the nut.

In the embodiment of the invention disclosed in Figure 1, the washer 20 is of the same external diameter throughout its length, so that the entire washer may fit within the bore of the neck 12 with the upper edge of the washer substantially on the same level as the shoulder 24.

In the modified form of the invention illustrated in Figure 4, the washer 25 is provided about its upper edge with the radially extending outer flange 26, the external diameter of the flange being substantially equal to the internal diameter of the counter-bore 18, so that the under surface of the flange may rest upon the shoulder 24. Otherwise, this form of the invention is substantially similar to that shown in Figure 1.

In order to prevent the nut 17 from being brought into frictional engagement with the sides of the bubbler head, the diameter of the nut is slightly less than the internal diameter of the counter-bore 18, so as to provide a clearance between the nut and the bubbler head.

It will be seen that by reason of the washer 20 being positively interlocked with the stem 15, that the bubbler head will be permitted to rotate freely about the nipple 14 without danger of the screw 17 becoming loose, due to the rotation of the bubbler head.

Obviously, the form of the invention herewith shown and described is merely illustrative and in no sense restrictive, and such changes as come within the purview of one skilled in the art may be made without departing from the spirit of the invention and the scope of the appended claims.

We claim:

1. The combination of a relatively stationary member, a revoluble member mounted on said stationary member, a retaining nut threaded to said stationary member, and non-rotatable means interlocked with said stationary member directly beneath said nut to prevent turning contact of the revoluble member with the nut.

2. The combination of a relatively stationary member, a revoluble member mounted on said stationary member, a retaining nut threaded to said stationary member, a non-rotatable washer between said nut and the lower end of said revoluble member, and means on said washer coacting with complementary means on said stationary member for positively preventing turning contact of the revoluble member with the nut.

3. In combination, a relatively stationary member having a threaded end and a serrated portion, a revoluble member mounted on said stationary member below said serrated portion, a retaining nut threaded to the end of said stationary member, and a washer having serrations adapted to interlock with the serrations on said stationary member to prevent turning contact of the revoluble member with the retaining nut while permitting the revoluble member to be freely rotatable on the stationary member.

4. In combination, a relatively stationary member having a reduced portion provided with serrations and a threaded end, a member revolubly mounted on said reduced portion, a retaining nut threaded to the end of the stationary member, and a washer having serrations on its inner surface adapted to interlock with the serrations on the stationary member to prevent turning contact of the revoluble member with the retaining nut while permitting the revoluble member to be freely rotatable on the stationary member.

In testimony whereof we have hereunto set our hands.

PHILIP MUELLER.
ANTON C. SCHUERMANN.